United States Patent

Kawase et al.

[11] Patent Number: 5,851,163
[45] Date of Patent: Dec. 22, 1998

[54] PLANETARY ROLLER TYPE POWER TRANSMISSION DEVICE

[75] Inventors: Tatsuo Kawase; Takashi Nozaki; Tomoaki Makino; Satoshi Utsunomiya, all of Iwata, Japan

[73] Assignee: NTN Corporation, Osaka-fu, Japan

[21] Appl. No.: 825,056

[22] Filed: Mar. 27, 1997

[30] Foreign Application Priority Data

| Mar. 29, 1996 | [JP] | Japan | 8-076156 |
| Mar. 29, 1996 | [JP] | Japan | 8-077344 |
| Mar. 29, 1996 | [JP] | Japan | 8-077355 |
| Jul. 18, 1996 | [JP] | Japan | 8-189677 |

[51] Int. Cl.⁶ ............... F16H 13/08
[52] U.S. Cl. ............... 475/183
[58] Field of Search ............... 475/183, 334, 475/346

[56] References Cited

U.S. PATENT DOCUMENTS

| 4,121,331 | 10/1978 | Fukuma et al. | 475/183 |
| 4,157,668 | 6/1979 | Fukuma et al. | 475/183 |
| 4,296,648 | 10/1981 | Okano et al. | 475/183 |
| 4,916,981 | 4/1990 | Suzuki et al. | 475/183 |
| 4,950,110 | 8/1990 | Suzuki | 475/183 |

*Primary Examiner*—Dirk Wright
*Attorney, Agent, or Firm*—Nikaido, Marmelstein, Murray & Oram LLP

[57] ABSTRACT

Plating 5 having good slide friction characteristics is applied onto the pocket surfaces 4a1, 4a2, which are opposite each other in the circumferential direction of the pockets 4a of the carrier and onto the end face 4a3 in the axial direction. It is possible to improve the lubrication conditions at the contacting area of the outer circumferential surface of the planetary rollers and the pocket surface 4a1 of the carrier 4 by coating the plating 5 having good slide friction characteristics onto the pocket surfaces 4a1,4a2 of the pocket 4 of the carrier 4 and further onto the end face 4a3. That is, the friction force at the contacting area is able to be decreased by the plating 5 having good friction characteristics, whereby even in a case where the contacting area is lubricated with a little lubricant, thermal deterioration of the lubricant due to heat generation of the contacting area is suppressed and good lubrication actions can be expected.

6 Claims, 13 Drawing Sheets

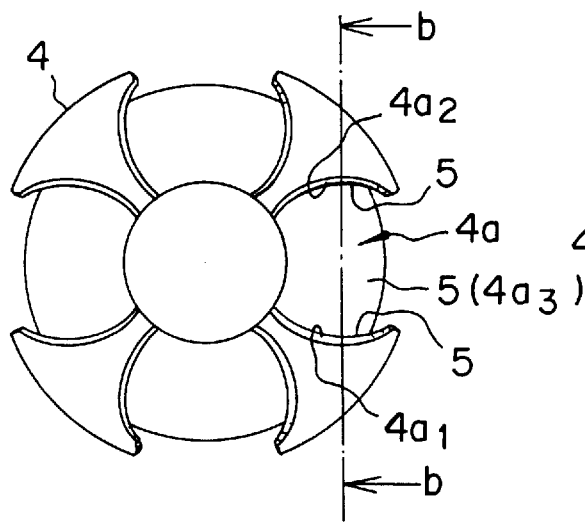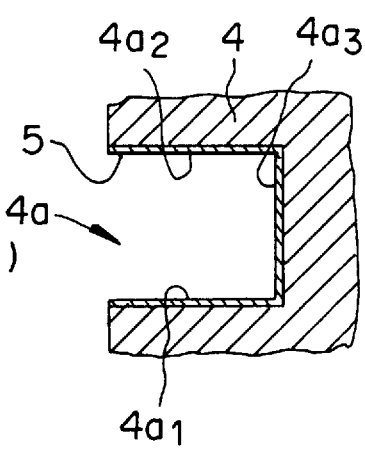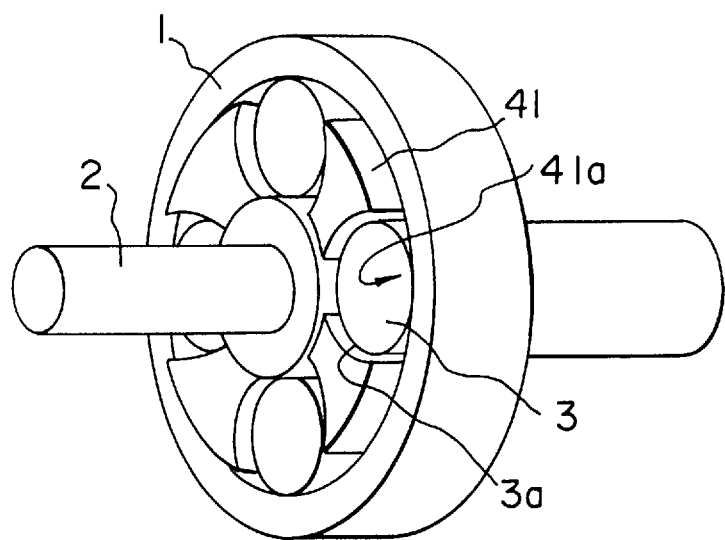

PLANETARY ROLLER TYPE POWER TRANSMISSION DEVICE

BACKGROUND OF THE INVENTION

The present invention relates to a planetary roller type power transmission device which transmits power between the sun axis and carrier via rotations of planetary rollers.

A power transmission device shown in FIGS. 23A and 23B has been already known as a planetary roller type power transmission device. The planetary roller type power transmission device comprises fixing wheel 1, a sun shaft 2 concentrically inserted along an axis into the fixing wheel 1, a plurality of planetary rollers 3 (for example, four) which intervene between the fixing wheel 1 and the sun shaft 2, and a carrier 4' equidistantly having a plurality of pockets 4'a (for example, four) in the circumferential direction, which are able to rollably retain the planetary rollers 3. The planetary rollers 3 are disposed between the inner circumferential surface 1a of the fixing wheel 1 and the outer circumferential surface 2a of the sun shaft 2 in a pressure-fit state, whereby when the sun shaft 2 rotates (usually the sun shaft 2 is connected to the prime mover shaft), the planetary rollers 3 revolve both round the sun shaft 2 and on their axes while contacting the outer circumferential surface 2a of the sun axis 2 in a rolling friction state. Thereby, the carrier 4' carries out orbital revolution at the number of revolutions, which is equal to the number of orbital revolutions of the planetary rollers 3 while performing a sliding contact with the outer circumferential surface 3a of the planetary rollers 3. As shown in FIG. 24, for example, if the sun shaft 2 rotates in the direction of the arrow U in the same drawing, the planetary rollers 3 each orbitally revolve in the direction of the arrow W while rotating on its own axis in the direction of the arrow V. Therefore, the carrier 4" rotates in the direction of the arrow W. In this case, the outer circumferential surface 3a of the planetary rollers 3 slides in contact with the pocket surface 4'a1 in the direction of rotation of the pockets 4'a of the carrier 4' and is not brought into contact with the pocket surface 4'a2 in the direction of non-rotation. Furthermore, in a case where the sun shaft 2 rotates in the direction opposite to the arrow U shown in the same drawing, the carrier 4' rotates in the direction opposite to the arrow W. Therefore, the outer circumferential surface 3a of the planetary rollers 3 is brought into contact with the pocket surface 4'a2 of the carrier 4'. When transmitting power, although the contacting area C of the outer circumferential surface 3a of the planetary roller 3 with the outer circumferential surface 2a of the sun shaft 2 and the contacting area E of the outer circumferential surface 3a of the planetary roller 3 with the inner circumferential surface 1a of the fixing wheel 1 usually accompany a slide which is less than 1%, they are nearly in a state of pure rolling contact. On the other hand, the contacting area D of the outer circumferential surface 3a of the planetary rollers 3 with the pocket surface 4'a1 of the carrier 4' is in a state of complete sliding contact. In order to decrease the friction at these contacting areas, lubrication is given, using grease or lubricating oil.

In this kind of planetary roller type power transmission device, the portions that constitute a problem in view of lubrication are the contacting area D of the outer circumferential surface 3a of the planetary rollers 3 with the pocket surface 4'a1 of the carrier 4' and the contacting area C of the outer circumferential surface 3a of the planetary rollers 3 with the outer circumferential surface 2a of the sun shaft 2. This is due to the following reason. That is, in this kind of planetary roller type power transmission device, a so-called exclusion phenomenon of lubricating oil arises, in which a majority of lubricant is axially excluded due to the rotations of the planetary rollers 3 and those of the carrier 4' in line therewith. Resultantly, the contacting areas C, D are lubricated with only a bit of lubricating oil to thereby cause the oil film to be likely to be broken due to a shortage of the lubricating oil or a thermal deterioration resulting from a little lubricating oil being exposed to a high temperature. Especially, since the contacting area D is in a state of complete sliding contact, the thermal deterioration of the lubricating oil is increased due to heat of friction if the friction force of the contacting area D is great, and the lubrication becomes unsatisfactory. On the other hand, according to the elastohydrodynamic lubrication theory, since the oil film thickness at a rolling contact part is dependent on the contact pressure of a contacting area, the thickness of the oil film at the contacting area C is made thinner than the thickness of the oil film at the contacting area E. Accordingly, the lubrication conditions of the contacting area C are severer than those of the contacting area E.

SUMMARY OF THE INVENTION

It is therefore an object of the invention to attempt to increase the service life of this kind of planetary roller type power transmission device by decreasing friction forces at the contacting area of the outer circumferential surface of planetary rollers with the outer circumferential surface of the sun shaft and the contacting area of the outer circumferential surface of planetary rollers with the pocket surface of a carrier, where the lubrication conditions are very severe, and accordingly by improving the lubrication conditions at these contacting areas.

In order to achieve the above object, with the invention, the carrier is provided with a friction force decreasing means for decreasing the friction force at at least one of the contacting area of the outer circumferential surface of planetary rollers with the outer circumferential surface of the sun shaft and the contacting area of the outer circumferential surface of planetary rollers with the pocket surface of the carrier. The friction force at the contacting areas is decreased by the friction force decreasing means secured at the carrier to thereby suppress the heat generation due to friction. Accordingly, in a case where the contacting area is lubricated with a little lubricant, the thermal deterioration of the lubricant due to heat generation at the contacting area is suppressed, and a good lubrication condition can be expected, whereby there causes no worry about a wearing due to defective lubrication of the contacting area and the power loss resulting from generation of heat of friction is able to be decreased.

As a friction force decreasing means, it is possible to incorporate a surface treatment, which has good friction characteristics, on at least one of the first pocket surface of the carrier, brought into contact with the outer circumferential surface of the planetary rollers and the second pocket surface thereof opposed thereto in the circumferential direction. The surface treatment may be either plating of a metallic material or film coating treatment of solid lubricant.

Furthermore, as the friction force decreasing means, it is possible to form the carrier of a material having good friction characteristics.

Still furthermore, as the friction force decreasing means, it is possible to form a concave lubricant reservoir on at least one of the first pocket surface or the second pocket surface of the carrier. It is preferable that the lubricant reservoir is shaped so that the same does not communicate to an opening in the axial direction, which is open in the axial direction of the pockets.

Furthermore, as the friction force decreasing means, it is possible to bring the carrier into contact with the outer circumferential surface of the sun shaft via an oil containing member.

BRIEF DESCRIPTION OF THE DRAWINGS

FIG. 1A is a front view showing a carrier according to a first preferred embodiment of the invention, and FIG. 1B is a cross-sectional view taken along the line b—b thereof.

FIG. 2 is a perspective view showing a planetary roller type power transmission device according to a second preferred embodiment of the invention.

DESCRIPTION OF PREFERRED EMBODIMENTS

Figures 23A, 23B:
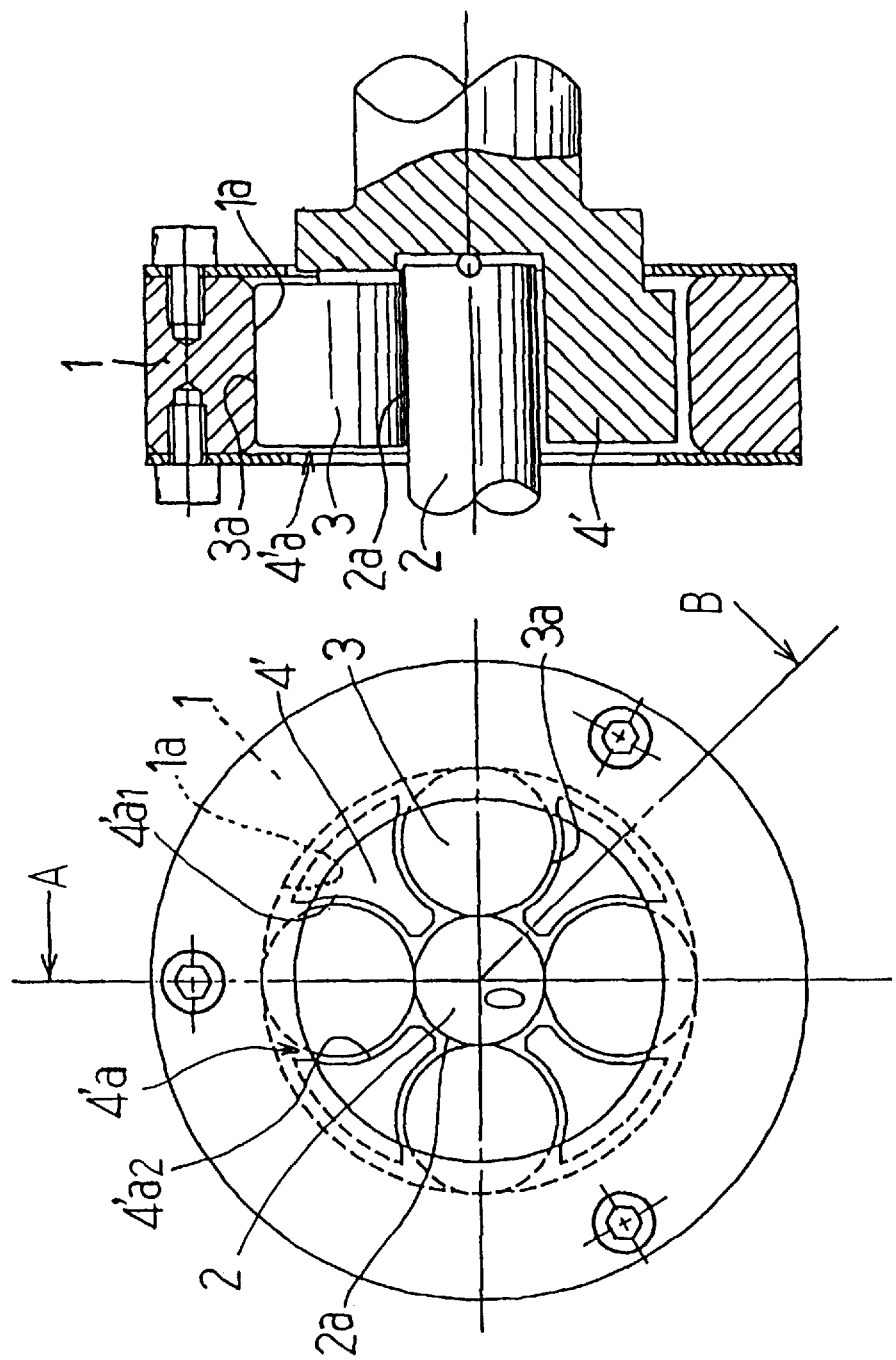
FIG. 23A is front elevational view of a conventional planetary roller type power transmission device.
FIG. 23B is a cross-sectional view taken along the line A-O-B thereof.
Figure 24:
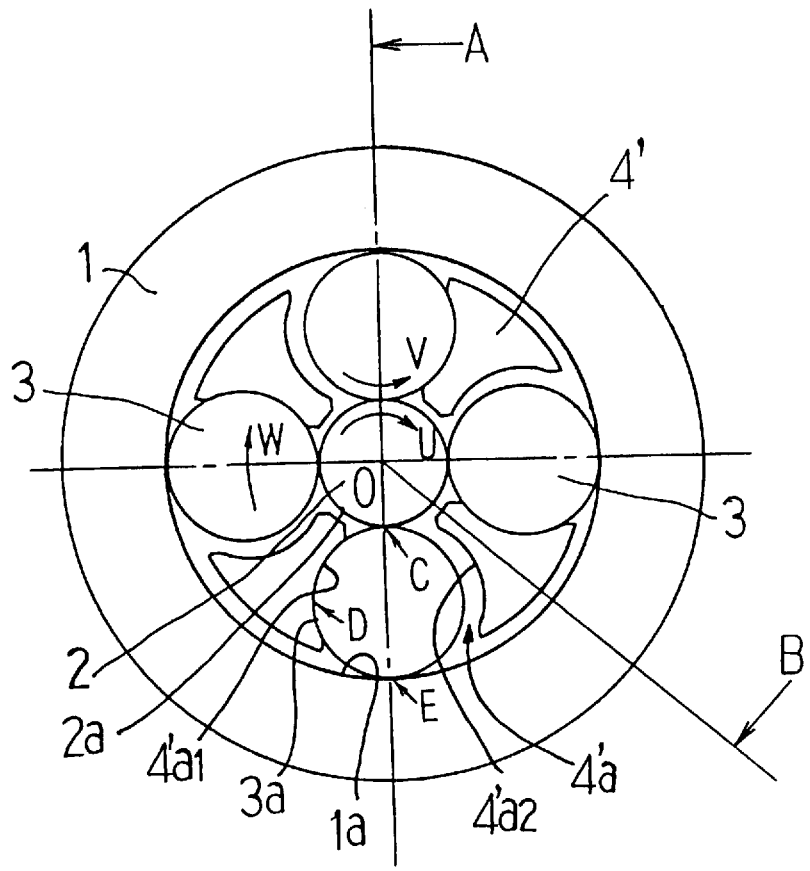
FIG. 24 is a cross-sectional view showing a conventional planetary roller type power transmission device.

Hereinafter, a description is given of preferred embodiments of the invention with reference to the drawings attached herewith. Furthermore, since the feature of the invention resides in providing a friction force decreasing means, the parts and members of the embodiments which are substantially identical to those of the conventional device shown in FIGS. 23A, 23B and FIG. 24 are given the same reference numbers throughout all the drawings, and the description thereof is omitted to prevent overlapped descriptions.

FIG. 1 shows a carrier 4 according to a first embodiment of the invention. A surface treatment having good slide friction characteristics, for example, plating 5, is given to the pocket surfaces 4$a$1, 4$a$2 opposed to each other in the circumferential direction of the pocket 4$a$ of the carrier 4 and to the end face 4$a$3 in the axial direction. Silver plating, copper plating or non-electrolytic nickel plating may be listed as the plating 5 having good slide friction characteristics.

By giving plating 5 having good slide friction characteristics to the pockets surfaces 4$a$1, 4$a$2 of the pockets 4$a$ of the carrier 4 and further to the end surface 4$a$3, it is possible to improve the lubrication conditions especially at the contacting area D (See FIG. 24, in a case where the sun shaft 2 rotates in the direction opposite the arrow U, the outer circumferential surface 3$a$ of the planetary roller 3 is brought into contact the pocket surface 4$a$2) of the outer circumferential surface 3$a$ of the planetary rollers 3 with the pocket surface 4$a$1 of the carrier 4. That is, the friction force at the contacting area D is decreased by the plating 5 having good slide friction characteristics to thereby suppress heat generation resulting from friction. Consequently, in a case where the contacting area D is lubricated with a little lubricant, the thermal deterioration of the lubricant due to the heat generation at the contacting are D is suppressed, and a good lubrication condition can be expected. Accordingly, there is no worry about wear due to defective lubrication at the contacting area D, and the power loss due to generation of friction heat is able to be lowered.

When the plating 5 contains a solid lubricant such as PTFE, MoS2, etc., the slide friction characteristics of the plating 5 may be further improved. Furthermore, a solid lubricant such as PTFE, graphite, $MoS_2$, etc. may be coated to be film-like as surface treatment having good slide friction characteristics instead of the plating 5. Still furthermore, when the hardness of the surface layer formed by the surface treatment having good slide friction characteristics is made lower than that of the outer circumferential surface of the planetary roller (generally made of bearing steel), the initial adaptability between both is made better, whereby it is expected that the service life is improved and the running-in operation is simplified. As such surface treatment, it is listed that a metallic material having a hardness which is lower than the material of which the planetary rollers are made is used for the plating and such a solid lubricant as described above is coated as a film. Furthermore, the surface treatment having good slide friction characteristics may be formed on at least the pocket surface of the pocket 4$a$ of the carrier 4, which is brought into contact with the outer circumferential surface of the planetary rollers. That is, the surface treatment may be formed on only the pocket surface 4$a$1 when the sun shaft 2 rotates in the direction shown in FIG. 24, and may be formed on only the pocket surface 4$a$2 when the same rotates in the direction opposite thereto. In a case where the sun shaft 2 rotates clockwise or counterclockwise, the surface treatment may be formed on both the pocket surfaces 4a1, 4a2.

FIG. 2 shows a second preferred embodiment of the invention. In this embodiment, the carrier 41 is formed of a material having good slide friction characteristics such as a copper alloy. As such a copper alloy, brass (C2600, etc.), free-cutting brass (C3560, etc.) or aluminium bronze (C6161, etc.) may be listed.

By forming the carrier 41 of a material having good slide friction characteristics, it is possible to improve the lubrication conditions at the contacting area of the planetary rollers 3 with the pockets 41a of the carrier 41. Furthermore, since the initial adaptability between the planetary rollers 3 and the pockets 41a is improved when a copper alloy, the hardness of which is lower than that of the planetary rollers 3 (generally made of bearing steel, etc.), is selected as a material for forming the carrier 41, the service life thereof is able to be further improved, and the running-in operation thereof is much simplified. Still furthermore, it is possible to easily form the carrier 41 of brass, etc. through forging, for example, cold forging. By producing the carrier 41 of a material having good forge moldability, the production process can be simplified, and it is advantageous in attempting to lower the production cost.

Figure 3:
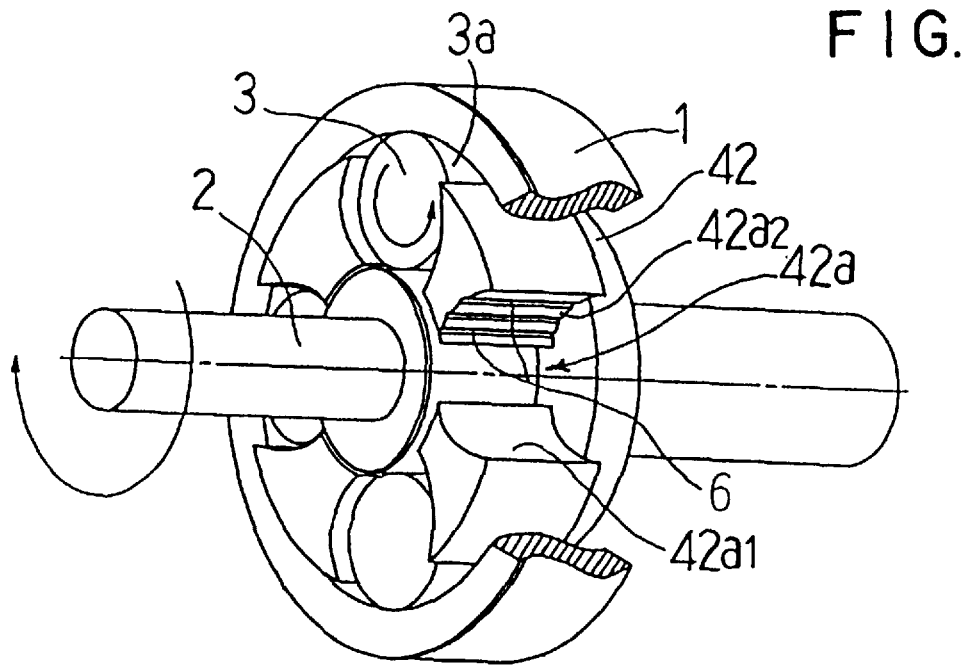
FIG. 3 is a perspective view showing a planetary roller type power transmission device according to a third preferred embodiment of the invention.

FIG. 3 shows a third embodiments of the invention. In this embodiment, a carrier 42 is composed of a resin material having good slide friction characteristics. As a resin material having good slide friction characteristics, for example, polyamide (PA66), polyacetar (POM), polyether ether ketone (PERK), polyamide imide (PAI), polyimide (PI), etc. are listed.

Figure 4A:
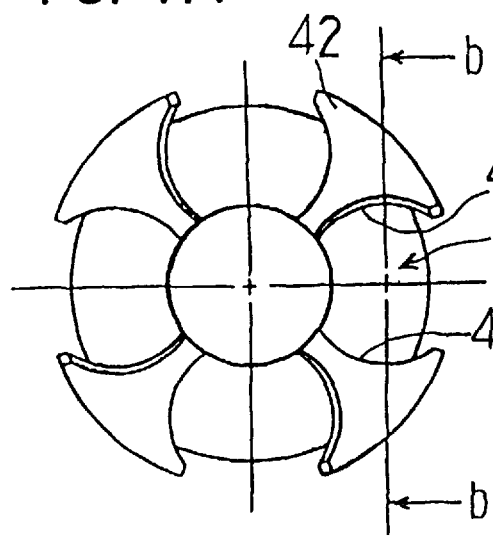
FIG. 4A is a front view showing a carrier according to the third preferred embodiment.
Figure 4B:
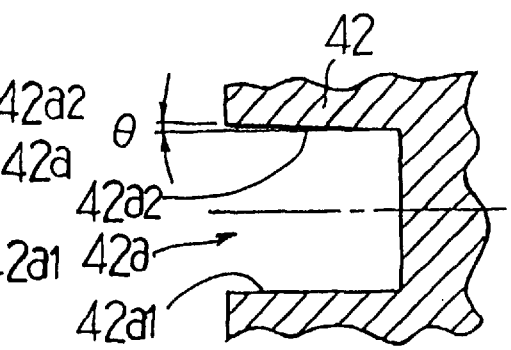
FIG. 4B is a cross-sectional view taken along the b—b thereof.

Furthermore, in this embodiment, a plurality of lubricant reservoirs 6 (for example, four) grooved in the axial direction are formed of the pocket surface 42a2, which is not in contact with the outer circumferential surface 3a of the planetary rollers 3, of the pocket surfaces 42a1, 42a2 opposed to each other in the circumferential direction of the pockets 42a of the carrier 42 (in a case where the sun shaft 2 rotates in the direction shown with the arrow in the same drawing). One end of the lubricant reservoirs 6 communicates with the opening in the axial direction of the pockets 42a. Still furthermore, in this embodiment, as shown in FIG. 4, the pocket surfaces 42a2 is formed to be tapered and open toward the opening in the axial direction of the pocket 42a (Taper angle θ).

By forming the carrier 42 of a resin material having good slide friction characteristics, it is possible to improve the lubrication conditions at the contacting area D of the outer circumferential surface 3a of the planetary rollers 3 with the pocket surface 42a1 of the pockets 42a of the carrier 42. Moreover, since a lubricant retained in the lubricant reservoirs 6 is supplied to the contacting area D of the outer circumferential surface 3a of the planetary roller 3 with the pocket surface 42a1 by forming the axially grooved lubricant reservoirs 6 on the pocket 42a2, the lubrication conditions of the contacting area D are further improved. Furthermore, since it is possible to easily form the resin material generally by injection molding, it is easy to form the axially grooved lubricant reservoirs 6. (It is possible to simultaneously form the same together with the basic formation of the carrier 42). Still furthermore, as in this embodiment, since it becomes easy to release moldings from their molds by making the pocket surface 42a2 tapered and open toward the opening in the axial direction, the production process is able to be simplified. However, if the pocket surface 42a1 is tapered, the pocket surface 42a1 will not evenly be brought into contact with the outer circumferential surface 3a of the planetary roller 3 and will become a factor by which a biased load is generated. It is not favorable.

Furthermore, such lubricant reservoirs 6 may be formed on the pocket surface 42a1 which is brought into contact with the outer circumferential surface 3a of the planetary roller 3 or may be formed on both the pocket surface 42a1 and pocket surface 42a2.

Figure 5:
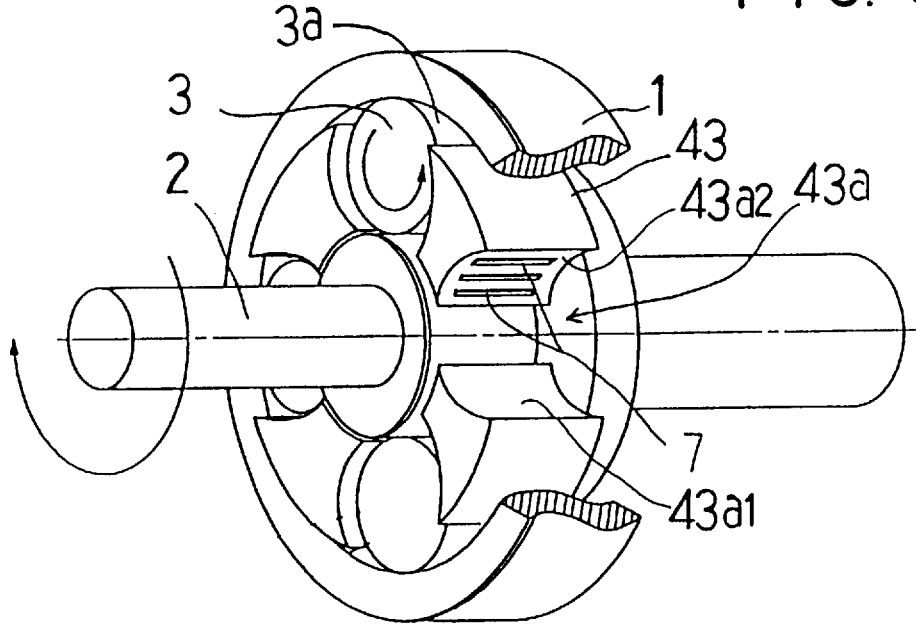
FIG. 5 is a perspective view showing a planetary roller type power transmission device according to a fourth preferred embodiment of the invention.

FIG. 5 shows a fourth embodiment of the invention. In this embodiment, a plurality of axially grooved lubricant reservoirs 7 (for example, three) are formed on the pocket surface 43a2 (in a case where the sun shaft 2 rotates in the direction shown by the arrow in the same drawing), which is not in contact with the outer circumferential surface 3a of the planetary rollers 3, of the pockets 43a1,43a2 opposed to each other in the circumferential direction of the pockets 43a of the carrier 43. However, the lubricant reservoirs 7 according to this embodiment do not communicate with the opening in the axial direction of the pocket 43a.

Since the lubricant retained in the lubricant reservoirs 7 is supplied to the contacting area D of the outer circumferential surface 3a of the planetary roller 3 with the pocket surface 43a1 by forming the axially grooved lubricant reservoirs 7 on the pocket surface 43a2 of the carrier 43, the lubrication conditions are improved. Since the lubricant reservoirs 7 do not communicate with the opening in the axial direction of the pocket 43a, the lubricant in the lubricant reservoirs 7 is able to be prevented from escaping into the opening in the axial direction Therefore, the lubrication conditions at the contacting area D are further improved.

Furthermore, such lubricant reservoirs 7 may be formed on the pocket surface 43a1 which is contact with the outer circumferential surface 3a of the planetary roller 3 or may be formed on both the pocket surface 43a1 and pocket surface 43a2.

Figure 6:
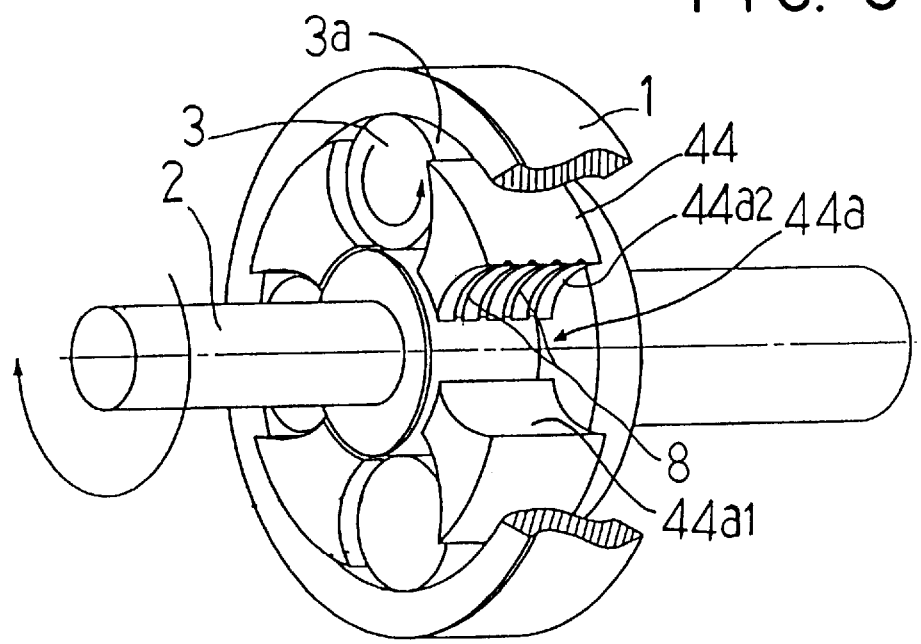
FIG. 6 to FIG. 8 are perspective views showing a planetary roller type power transmission device according to modifications of the fourth preferred embodiment.
Figure 7:
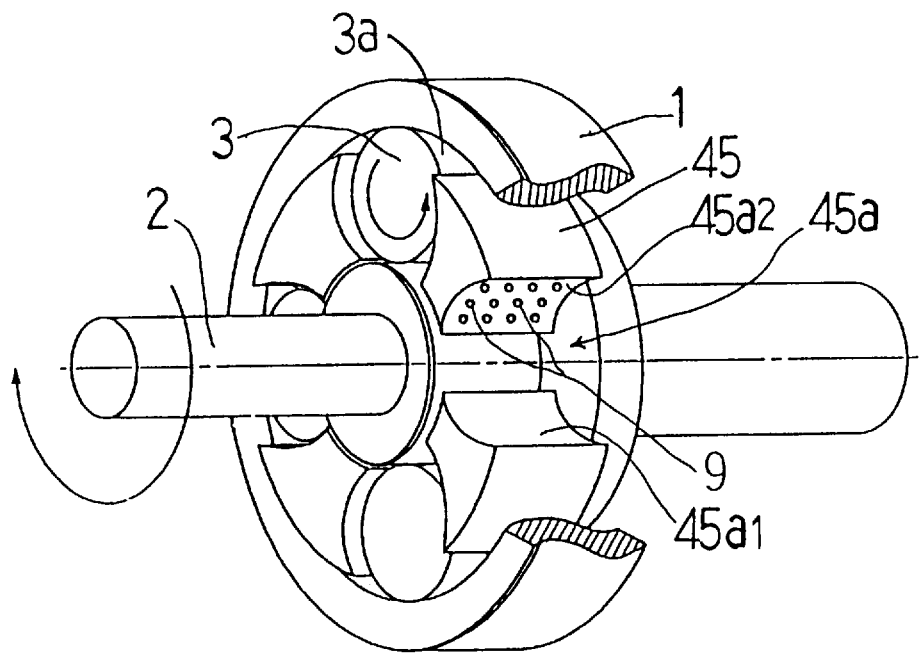
Figure 8:
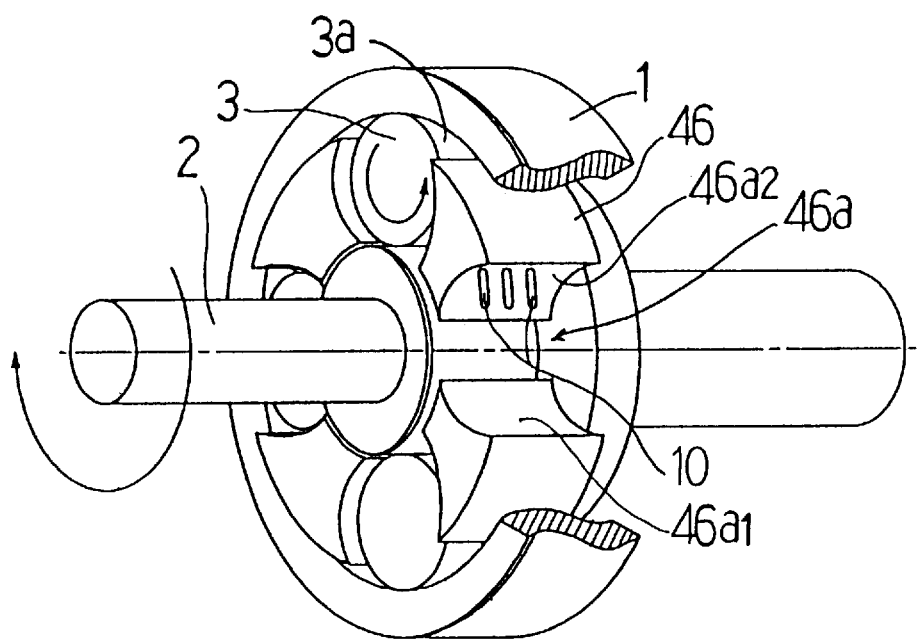

FIG. 6 to FIG. 8 each show a modification of the embodiment shown in FIG. 5. The actions and effects brought by the modifications are the same as those according to the embodiment shown in FIG. 5.

In the modification shown in FIG. 6, a plurality of radially grooved lubricant reservoirs 8 (for example, four) are formed on the pocket surface 44a2 (in a case where the sun shaft 2 rotates in the direction shown by the arrow in the same drawing), which is not contact with the outer circumferential surface 3a, of the pocket surfaces 44a1, 44a2 opposed to each other in the circumferential direction of the pocket 44a of the carrier 44. Furthermore, although the lubricant reservoirs 8 shown in the same drawing communicate with the opening in the radial direction of the pocket 44a, they may not communicate with the opening in the radial direction. An important point is that the lubricant reservoirs 8 do not communicate with the opening in the axial direction. Furthermore, the lubricant reservoirs 8 may be formed on the pocket surface 44a1 which is contact with the outer circumferential surface 3a of the planetary roller 3, or may be formed on both the pocket surfaces 44a1 and 44a2.

In the modification shown in FIG. 7, dimple-like lubricant reservoirs 9 are formed on the pocket surface 45a2 (in a case where the sun shaft 2 rotates in the direction shown by the arrow in the same drawing), which is not in contact with the outer circumferential surface 3a of the planetary roller 3, of the pocket surfaces 45a1, 45a2 opposed to each other in the circumferential direction of the pocket 45a of the carrier 45. The lubricant reservoirs 9 may be formed on the pocket surface 45a1 which is contact with the outer circumferential surface 3a of the planetary roller 3 or may be formed on both the pocket surfaces 45a1 and 45a2.

In the modification shown in FIG. 8, a plurality of radially grooved lubricant reservoirs 10 (for example, three) having a fixed inclination angle with respect to the rotation direction are formed on the pocket surface 46a2 (in a case where the sun shaft 2 rotates in the direction shown by the arrow in the same drawing), which is not contact with the outer circumferential surface 3a of the planetary roller 3, of the pocket surfaces 46a1,46a2 opposed to each other in the circumferential direction of the pocket 46a of the carrier 46. Furthermore, although the lubricant reservoirs 10 do not communicate with the opening in the radial direction of the pocket 46a, they may communicate with the opening in the radial direction. An important factor is that the lubricant reservoirs 10 do not communicate with the opening in the axial direction. Still furthermore, the lubricant reservoirs 10 may be formed on the pocket surface 46a1 which is contact with the outer circumferential surface 3a of the planetary roller 3 or may be formed on both the pocket surfaces 46a1 and 46a2.

Figure 9:
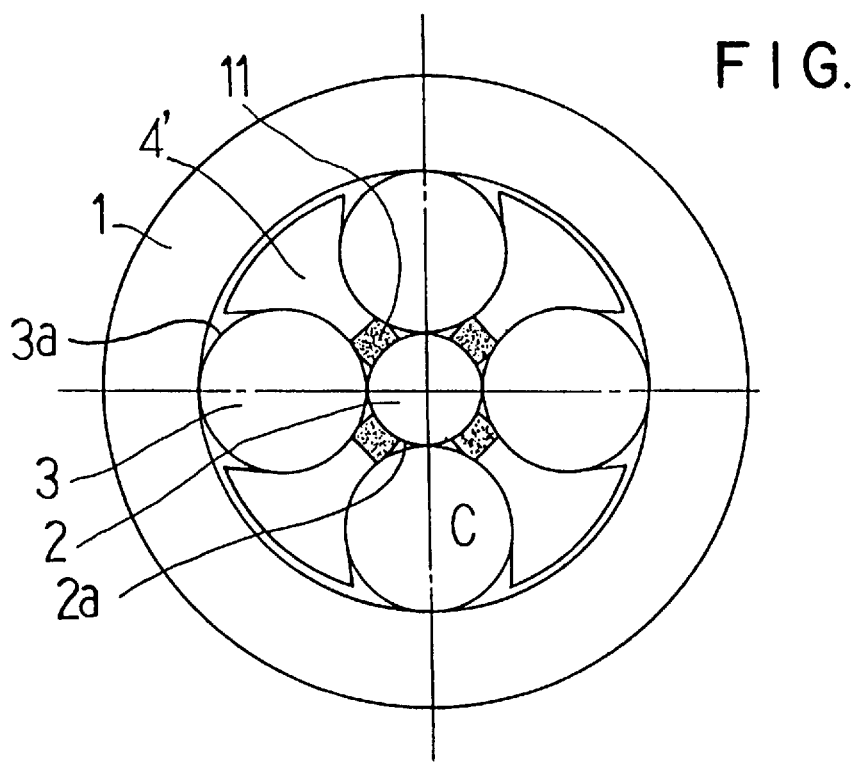
FIG. 9 is a cross-sectional view showing a planetary roller type power transmission device according to a fifth preferred embodiment of the invention.

Hereupon, in this kind of planetary roller type power transmission device, since the outer circumferential surface of a planetary roller is in biased contact with the pocket surface of a carrier if the axial center of the sun shaft does not coincide with that of the carrier, there is a possibility to bring about oil film breakdown due to the contact pressure at the contacting area D of the outer circumferential surface of the planetary roller with the pocket surface being locally increased. Furthermore, an ineffective radial force operates on torque transmission and results in an increase of the contact pressure at the contacting area C of the outer circumferential surface of a planetary roller with the outer circumferential surface of the sun axis and the contacting area E of the outer circumferential surface of a planetary roller with the inner circumferential surface of the fixing wheel Simultaneously, a power loss results therefrom As described above, since the lubrication conditions at the contacting area C are severer than those at the contacting area E, it is important to improve the lubrication conditions especially at the contacting area C. Accordingly, in the embodiment shown in FIG. 9, the inner circumference of the carrier 4' is brought into contact with the outer circumferential surface 2a of the sun shaft 2 via an oil containing member 11 in order to prevent any eccentricity between the axial center of the sun shaft 2 and that of the carrier 4' and improve the lubrication conditions at the contacting area C. Since no play is allowed at the carrier 4' when the carrier 4' is brought into contact with and guided by the outer circumferential surface 2a of the sun shaft 2. via such an oil containing member 11, it is possible to prevent any eccentricity between the axial center of the sun shaft 2 and that of the carrier 4'. Furthermore, since the carrier 4' is brought into contact with the outer circumferential surface 2a of the sun shaft via the oil containing member 11, a lubricant impregnated in the oil containing member 11 is always supplied onto the outer circumferential surface 2a of the sun shaft 2, thereby improving the lubrication conditions at the contacting area C.

The oil containing member 11 is such that a lubricant is impregnated in a porous material made of, for example, a sintered material, or that a mixture of a resin material and a lubricant is solidified by heating and cooling. The oil containing member 11 is secured to the inner circumference of the carrier 4' so that the same is brought into contact with the outer circumferential surface 2a of the sun shaft 2 or is brought into contact with both the outer circumferential surface 2a of the sun shaft 2 and the outer circumferential surface 3a of the planetary roller 3. Furthermore, the oil containing member 11 and carrier 4' may be molded to be integral with each other.

This kind of planetary roller type power transmission device usually is constructed so that the carrier thereof is made integral with the output shaft. Therefore, the abovementioned problems arise if there is any axial eccentricity between the sun shaft, which becomes the input shaft, and the output shaft. On the other hand, since the coaxialness of the sun shaft and output shaft depends on the production accuracy and assembling accuracy of the sun shaft, output shaft, carrier, housing, etc., highly accurate machining and assembling are required to secure the coaxialness of the sun shaft and output shaft, whereby the production cost is increased.

Furthermore, when the theory of a journal bearing is applied to the contacting area D of the outer circumference of the planetary roller with the pocket surface of the carrier where the radius of curvature of the planetary roller is r1 and the radius of curvature of the pocket surface of the carrier is r2, $(r2-r1)/r1=1/1000$ to $1/500$ is favorable in view of the lubrication. However, a biased contact results from the axial center of the sun shaft eccentricity only 0.001 r1 from the axial center of the output shaft between the outer circumferential surface of the planetary roller and the pocket surface of the carrier. Contrarily, in order to prevent such a biased contact, it is necessary that the radius r2 of curvature is made larger than the abovementioned optimal value, whereby the contact pressure will be further increased. The construction shown in FIG. 10 and FIG. 11 ensures that even though there is some eccentricity between the axial centers of the sun shaft and output shaft, the outer circumferential surface of the planetary roller and the pocket surface are able to be brought into contact with each other in an optimal state by forming the carrier separately from the output shaft and connecting the carrier to the output shaft with a connection structure having a degree of freedom in the radial direction. By employing such a construction, it is possible to reduce a eccentricity between the axial center of the sun axis and that of the output shaft at the connection part having a degree of freedom in the radial direction between the carrier and the output shaft. Therefore, it will not be necessary to keep the machining accuracy of components of the sun shaft, output shaft and housing and assembling accuracy thereof at a high level in order to secure the coaxialness thereof, and it is possible to avoid an increase of the contact pressure of the contacting parts.

Figure 10:
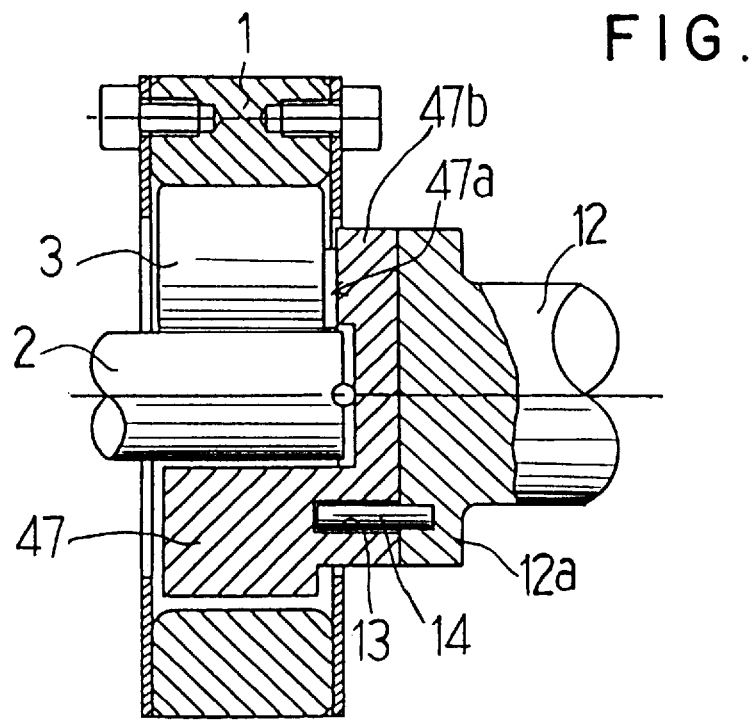
FIG. 10 is a cross-sectional view showing a planetary roller type power transmission device according to a sixth preferred embodiment of the invention.
Figure 11:
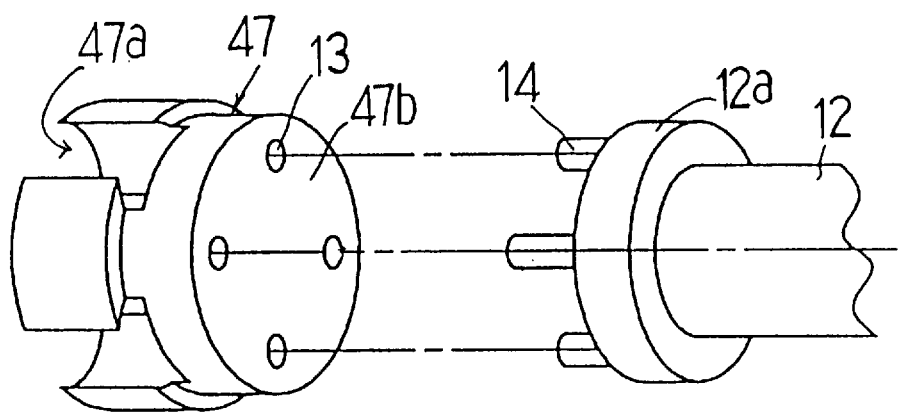
FIG. 11 is a perspective view showing the carrier and output shaft in the six preferred embodiment.

With a sixth embodiment shown in FIG. 10 and FIG. 11, the carrier 47 is made separate from the output shaft 12 and have a plurality of pockets 47a, which rollably retain the planetary rollers 3, equidistantly on the circumference. A plurality of insertion ports 13 (for example, four) are equidistantly disposed on the circumference at the seat part 47b of the carrier 47. Furthermore, pin-like insertion members 14 to be inserted into the insertion ports 13 of the carrier 47 put into or formed integrally with the seat part 12a secured integrally with the axial end of the output shaft 12. The diameter of the pin-like insertion members 14 is an appointed amount smaller than that of the insertion ports 13.

By inserting the insertion members 14 of the output shaft 12 into the insertion ports 13 of the carrier 47, thereby connecting the carrier 47 to the output shaft 12, a degree of freedom in the radial direction is given to the connection part between the carrier 47 and the output shaft 12 equivalently to the clearance between the insertion ports 13 and the insertion members 14. Therefore, even though there is a eccentricity between the axial center of the sun shaft 2 and that of the output shaft 12, the eccentricity is able to be absorbed at the connection part. Still furthermore, contrary to the above description, the insertion members nay be provided at the carrier 47 and the insertion ports may be secured at the output shaft 12.

FIG. 12 through FIG. 15 show modifications of the connection structure between the carrier 47 and the output shaft 12.

Figure 12:
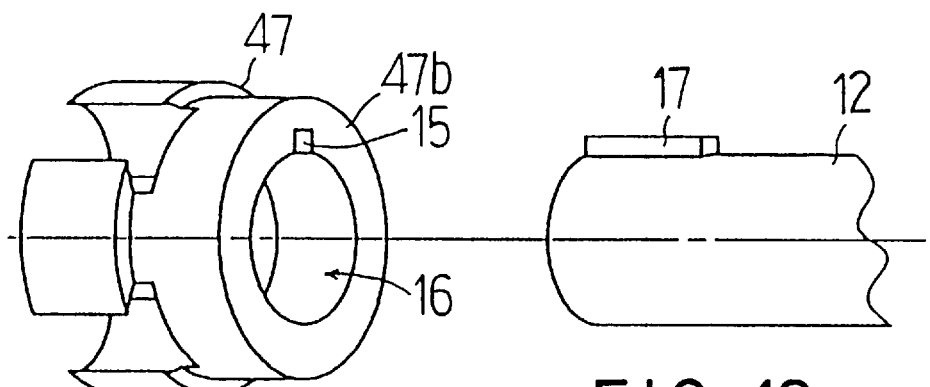
FIG. 12 to FIG. 15 are perspective views showing the carrier and output shaft according to modifications of the sixth preferred embodiment.

In the modification shown in FIG. 12, a fitting hole 16 having a key groove 15 is secured at the seat part 47b of the carrier 47 and a key 17 is provided at the axial end of the output shaft 12, wherein the diameter of the output shaft 12 is made an appointed amount smaller than that of the fitting hole 16. By fitting the axial end of the output shaft 12 in the fitting hole 16 of the carrier 47 and placing the key 17 in the key groove 15, the carrier 47 is able to be connected to the output shaft 12 with a degree of freedom in the radial direction.

Figure 13:
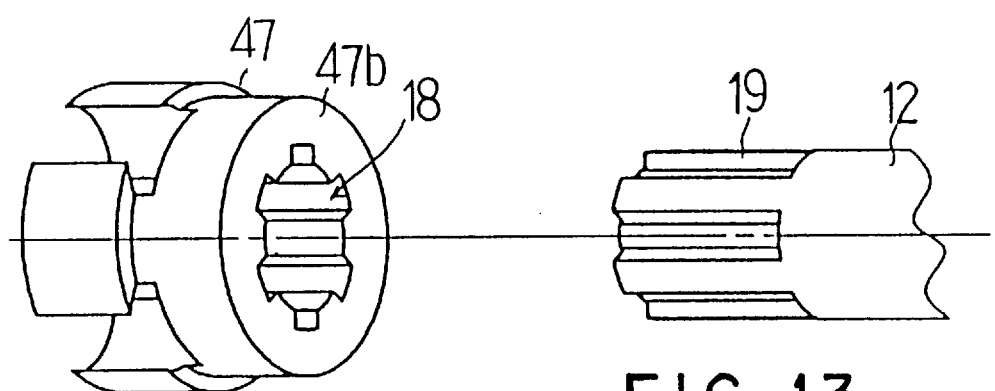

In the modification shown in FIG. 13, a spline hole 18 is provided at the seat part 47b of the carrier 47, and splines 19 are secured at the axial end of the output shaft 12. The diameter of the splined 19 is made an appointed amount smaller than that of the spline hole 18. The splines 19 of the output shaft 12 are fitted into the spline hole 18 of the carrier 47, whereby the carrier 47 is connected to the output shaft 12 with a degree of freedom in the radial direction.

Figure 14:
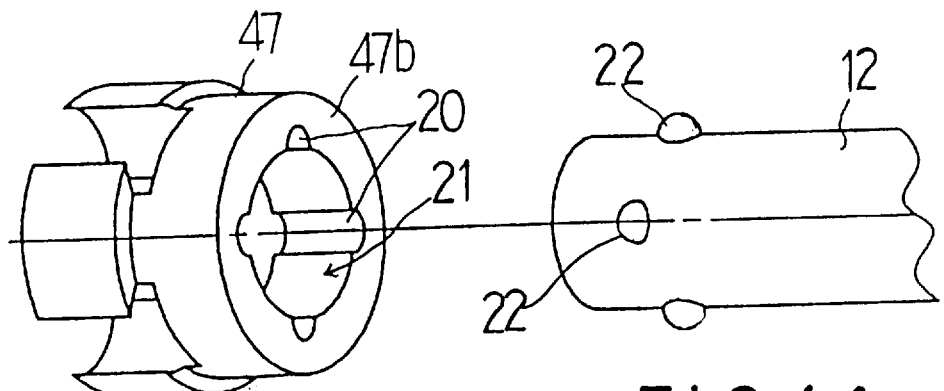

In the modification shown in FIG. 14, a fitting hole 21 having a plurality of semi-circular grooves 20 (for example, four) equidistantly in the circumferential direction is provided at the seat part 47b of the carrier 47, and a plurality of steel balls 22 (the same number of that of the semi-circular grooves 20) are projectingly secured to the axial end of the output shaft 12 equidistantly in the circumferential direction. The diameter of the output shaft 12 is made an appointed amount smaller than that of the fitting hole 21. The axial end of the output shaft 12 is fitted into the fitting hole 21 of the carrier 47 and simultaneously the steel balls 22 are fitted into the semi-circular grooves 20, whereby the carrier 47 is connected to the output shaft 12 with a degree of freedom in the radial direction.

Figure 15:
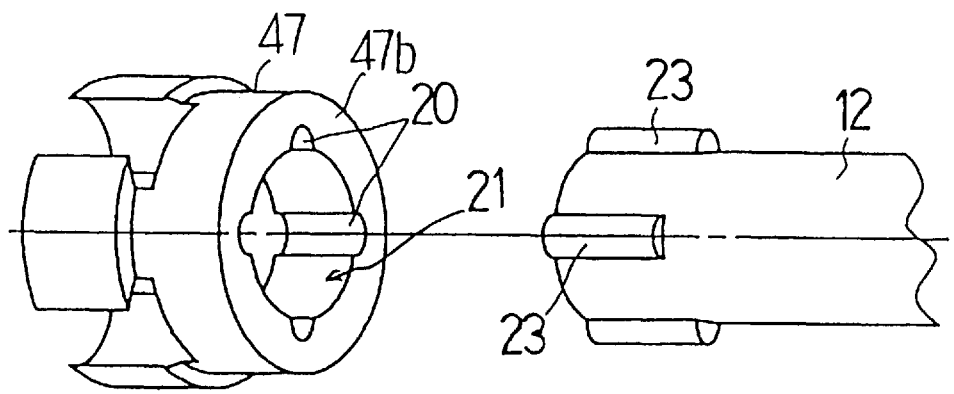

In the modification shown in FIG. 15, a fitting hole 21 having a plurality of semicircular grooves 20 (for example, four) equidistantly in the circumferential direction is provided at the seat part 47b of the carrier 47, and a plurality of roller-shaped members 23 (the sane number as that of the semi-circular grooves 20) are projectingly attached to the axial end of the output shaft 12 equidistantly in the circumferential direction. The axial end of the output shaft 12 is fitted into the fitting hole 21 of the carrier 47 and simultaneously the roller-shaped members 23 are fitted into the semi-circular grooves 20, whereby the carrier 47 is connected to the output shaft 12 with a degree of freedom in the radial direction.

The carrier 47 referred to in each of the abovementioned embodiments is able to be formed of a material having good friction characteristics, for example, oil containing sintered material, metallic material, such as copper alloy resin material such as polyamide (PA66), polyacetar (POM), polyether ether ketone (PEEK), polyamide imide (PAI), polyimide (PI), etc. By forming the carrier 47 of a material having good friction characteristics, the lubrication conditions at the contacting area D of the outer circumferential surface of the planetary rollers 3 with the pocket surface of the carrier 47 are improved. And similar effects can be brought by giving a surface treatment having good friction characteristics onto the pocket surfaces of the carrier 47, for example, plating treatment such as silver plating, copper plating, non-electrolytic nickel plating, etc., or film coating treatment such as PTFE, graphite, $MoS_2$, etc.

Figure 16:
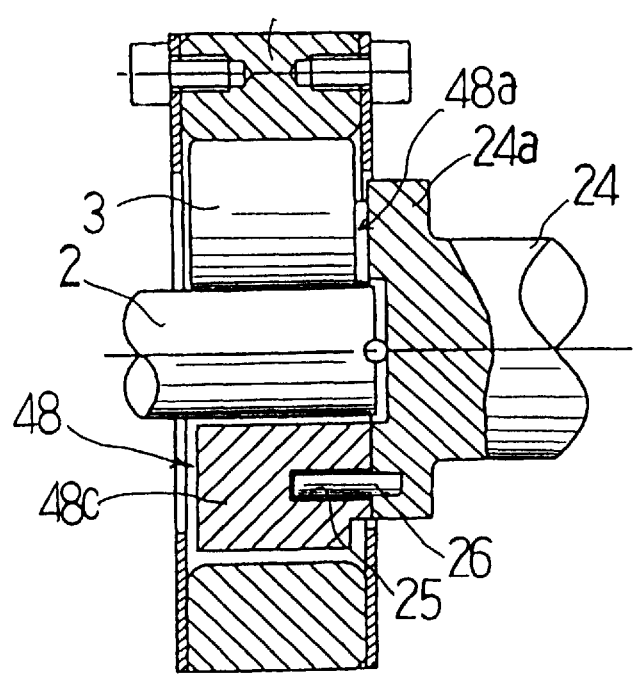
FIG. 16 is a cross-sectional view showing a planetary roller type transmission device according to a seventh preferred embodiment of the invention.
Figure 17:
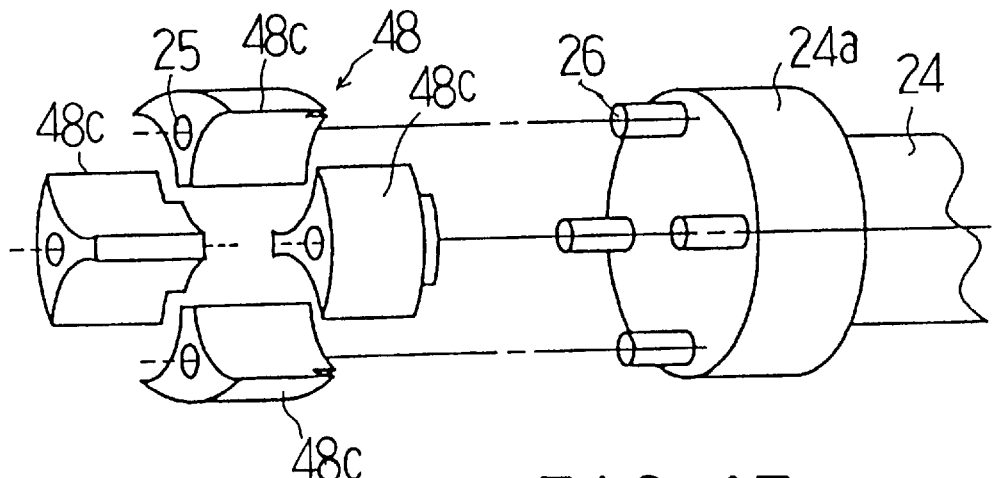
FIG. 17 is a perspective view showing the carrier and output shaft in the seventh preferred embodiment.

In a seventh embodiment of the invention, which is shown in FIG. 16 and FIG. 17, the carrier 48 is composed of a plurality of carrier pieces 48c (for example, four), Bach of the carrier pieces 48c is attached to the seat part 24a of the output shaft 24 equidistantly in the circumferential direction with a degree of freedom in the radial direction. A pocket 48a which is able to rollably retain a planetary roller 3 is formed between the circumferentially adjacent carrier pieces 48c.

The connection of the carrier pieces 48c with the output shaft 24 is carried out by inserting a plurality of pin-like inserting members 26 (the sane number as that of the carrier pieces 48c) equidistantly and projectingly attached to the seat part 24a of the output shaft 24 or provided to be integral therewith, into an insertion hole 25 secured at each of the carrier pieces 48c. The diameters of the inserting members 26 are made an appointed amount smaller than that of the their insertion holes 25.

Since a planetary roller type power transmission device according to the embodiment is constructed so that the carrier 48 is composed of a plurality of carrier pieces 48c and simultaneously the respective carrier pieces 48c are connected to the output shaft 24 by adapting the inserting members 26 to the abovementioned insertion holes 25, each of the carrier pieces 48c independently has a degree of freedom in the radial direction equivalent to the clearance between the respective insertion holes 25 and inserting members 26, and further simultaneously the same has a degree of freedom in the direction of rotation centering around the inserting members 26. Therefore, if the eccentricity between the axial center of the sun shaft 2 and that of the output shaft 24 is within the degree of freedom, the carrier pieces 48c are able to move along the outer circumferential surface of the planetary roller 3, thereby causing the eccentricity to be reduced. Furthermore, even though the radius of curvature of the pocket surface of the respective carrier pieces 48c is defined to an optimal value in view of the lubrication since each of the carrier pieces 48c independently has a degree of freedom, no biased contact arises between the outer circumferential surface of the planetary rollers 3 and the pocket surface.

Figure 18:
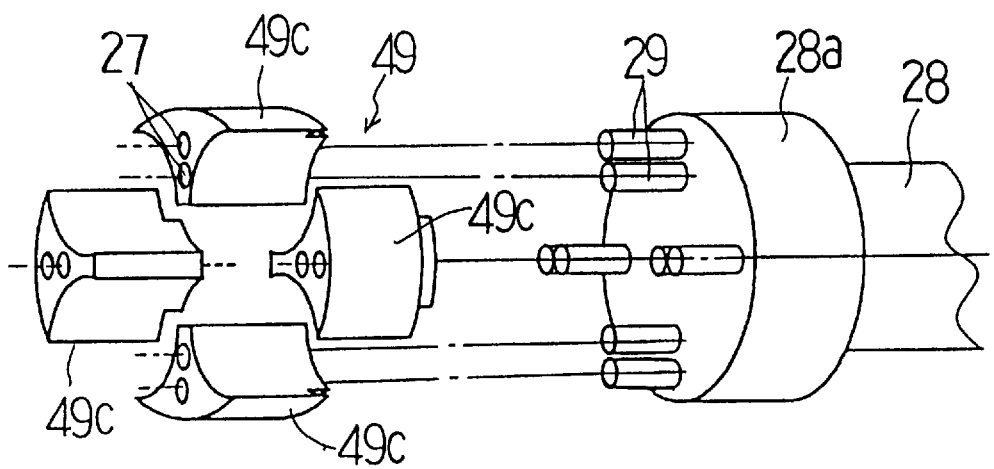
FIG. 18 is a perspective view showing the carrier and output shaft according to modifications of the seventh preferred embodiment.

In the modification shown in FIG. 18, two insertion holes 27 are provided at each of the carrier pieces 49c, and in line therewith, inserting members 29 are secured two by two to the seat part 25a of the output shaft 28 equidistantly in the circumferential direction as pairs. All the other points are in compliance with the abovementioned embodiment.

Furthermore, in the abovementioned embodiment, the inserting members may be provided in the carrier pieces, and the insertion hole may be provided at the output shaft. Still furthermore, the carrier pieces may be formed of a material having good friction characteristics as described above, or a surface treatment having good friction characteristics may be given to the pocket surface of the carrier pieces.

This kind of planetary roller type power transmission device acts as a speed accelerator if torque is loaded from the output shaft side in a case where the sun shaft is connected to the prime mover shaft and the carrier is connected to the output shaft or are made to be integral with the output shaft, whereby the prime mover shaft will rotate. In this case, the rotation of the prime mover shaft becomes a load which results in an increase of the power loss and a shortening of the service life of the planetary roller type power transmission device. The construction shown in FIG. 19 through FIG. 22 is such that, in order to solve such problems, a one-way clutch intervenes between the prime mover shaft and the sun shaft or between the carrier and the output shaft.

Figure 19:
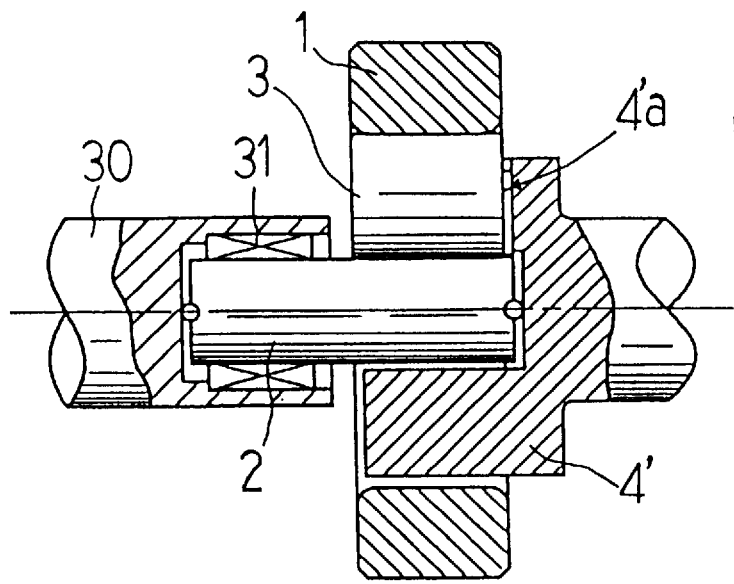
FIG. 19 is a cross-sectional view showing a planetary roller type power transmission device according to an eighth preferred embodiment of the invention.

In an eighth embodiment shown in FIG. 19, a one-way clutch 31 is disposed between the prime mover shaft 30 and the sun shaft 2. The one-way clutch 31 intervenes between the inner circumferential surface of the cylindrical part secured at the axial end of the prime mover shaft 30 and the outer circumferential surface of the axial end of the sun shaft 2 and is constructed so that the same is connected with respect to load from the prime mover shaft 30 to the sun shaft 2 and contrarily is disconnected with respect to load from the sun shaft 2 to the prime mover shaft 30. Therefore, in a case where torque is loaded from the primer mover axis 30, the prime mover shaft 30 is connected to the sun shaft 2 via the one-way clutch 31, thereby causing the torque from the prime mover shaft 30 to be transmitted to the sun shaft 2. And the torque transmitted to the sun shaft 2 is transmitted from the sun shaft 2 to the output shaft via the planetary roller 3 and carrier 4'. On the other hand, in a case where torque is loaded from the sun shaft 2 (output shaft side), the prime mover shaft 30 and sun shaft are disconnected from each other via the one-way clutch 31, whereby the transmission of torque from the sun shaft 2 to the prime mover shaft 30 is interrupted.

Figure 20:
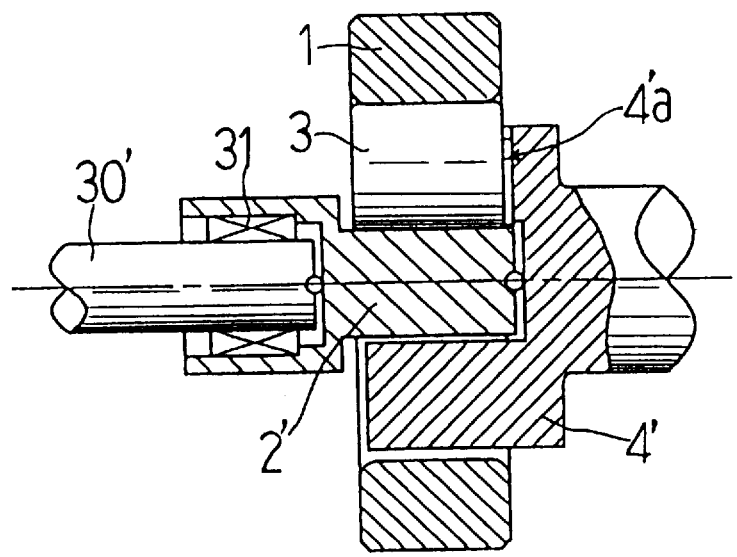
FIG. 20 is a cross-sectional view showing a planetary roller type power transmission device according to modifications of the eighth preferred embodiment.

In the modification shown in FIG. 20, a one-way clutch 31 is provided between the outer circumferential surface of the axial end of the prime mover shaft 30' and the inner circumferential surface of the cylindrical part secured at the axial end of the sun shaft 2'. All the other points are identical to those shown in FIG. 19.

Figure 21:
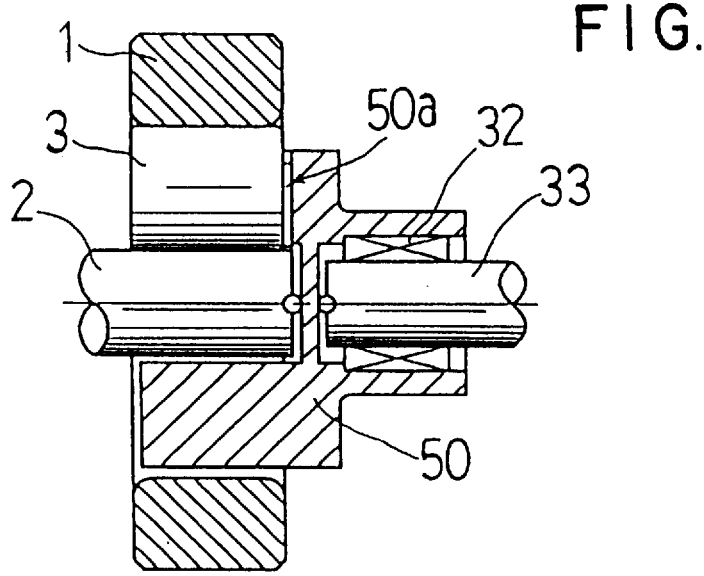
FIG. 21 is a cross-sectional view showing a planetary roller type power transmission device according to a ninth preferred embodiment of the invention.

In a ninth embodiment shown in FIG. 21, a one-way clutch 32 is disposed between the carrier 50 and the output shaft 33. The one-way clutch 32 intervenes between the inner circumferential surface of the cylindrical part secured to the axial end of the carrier 50 and the outer circumferential surface of the axial part of the output shaft 33 and the same is constructed so that it is connected with respect to the torque load from the carrier 50 to the output shaft 33 and contrarily is disconnected with respect to the torque load from the output shaft 33 to the carrier 50. Therefore, in a case where torque is loaded from the carrier 50, the carrier 50 is connected with the output shaft 33 via the one-way clutch 32 to cause the torque from the carrier 50 to be transmitted to the output shaft 33. On the other hand, in a case where torque is given from the output shaft 33, the carrier 50 is disconnected from the output shaft 33 via the one-way clutch 32, thereby causing the torque transmission from the output shaft 33 to the carrier 50 to be interrupted.

Figure 22:
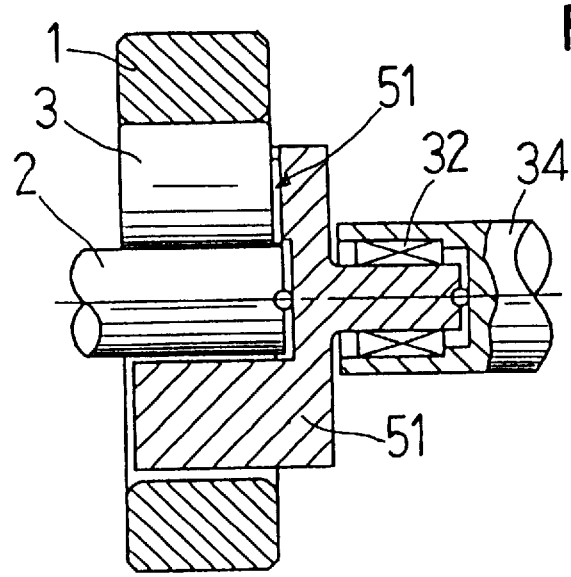
FIG. 22 is a cross-sectional view showing a planetary roller type power transmission device according to modifications of the ninth preferred embodiment.

In the modification shown in FIG. 22, the one-way clutch 32 is disposed between the outer circumferential surface of the axial end of the carrier 51 and the inner circumferential surface of the cylindrical part secured to the axial end of the output shaft 34. All the other points are identical to those in the preferred embodiment shown in FIG. 21.

What is claimed is:

1. A planetary roller type power transmission device transmitting power between a sun shaft and a carrier via rotations of planetary rollers, comprising:
   a fixing wheel;
   the sun shaft being coaxially inserted into said fixing wheel; the plurality of planetary rollers disposed between an inner circumferential surface of said fixing wheel and an outer circumferential surface of said sun shaft; and
   the carrier having pockets for rollably retaining said planetary rollers, each of the pockets having a first pocket surface being slidably contact with an outer circumferential surface of the planetary roller and a second pocket surface opposed to said first pocket surface in the circumferential direction
   wherein said carrier is provided with a friction force decreasing means for decreasing the friction force at at least one of the contacting area of the outer circumferential surface of the planetary rollers with the outer circumferential surface of the sun shaft and the contacting area of the outer circumferential surface of the planetary rollers with the first pocket surface of the carrier,
   wherein said friction force decreasing means is a surface treatment of a low friction material and is applied to at least one of the first pocket surface and the second pocket surface of the carrier.

2. A planetary roller type power transmission device as set forth in claim 1, wherein said surface treatment is one of a plating treatment of a metallic material and a film coating treatment of solid lubricant.

3. A planetary roller type power transmission device transmitting power between a sun shaft and a carrier via rotations of planetary rollers, comprising:
   a fixing wheel;
   the sun shaft being coaxially inserted into said fixing wheel; the plurality of planetary rollers disposed between an inner circumferential surface of said fixing wheel and an outer circumferential surface of said sun shaft; and
   the carrier having pockets for rollably retaining said planetary rollers, each of the pockets having a first pocket surface being slidably contact with an outer circumferential surface of the planetary roller and a second pocket surface opposed to said first pocket surface in the circumferential direction
   wherein said carrier is provided with a friction force decreasing means for decreasing the friction force at at least one of the contacting area of the outer circumferential surface of the planetary rollers with the outer circumferential surface of the sun shaft and the contacting area of the outer circumferential surface of the planetary rollers with the first pocket surface of the carrier,
   wherein said friction force decreasing means is such that the carrier is formed of a low friction material.

4. A planetary roller type power transmission device transmitting power between a sun shaft and a carrier via rotations of planetary rollers, comprising:
   a fixing wheel;
   the sun shaft being coaxially inserted into said fixing wheel; the plurality of planetary rollers disposed between an inner circumferential surface of said fixing wheel and an outer circumferential surface of said sun shaft; and
   the carrier having pockets for rollably retaining said planetary rollers, each of the pockets having a first pocket surface being slidably contact with an outer circumferential surface of the planetary roller and a second pocket surface opposed to said first pocket surface in the circumferential direction
   wherein said carrier is provided with a friction force decreasing means for decreasing the friction force at at least one of the contacting area of the outer circumferential surface of the planetary rollers with the outer circumferential surface of the sun shaft and the contacting area of the outer circumferential surface of the planetary rollers with the first pocket surface of the carrier, wherein said friction force decreasing means is such that the carrier is brought into contact with the outer circumferential surface of the sun shaft via an oil containing member.

5. A planetary roller type power transmission device transmitting power between a sun shaft and a carrier via rotations of planetary rollers, comprising:

a fixing wheel;

the sun shaft being coaxially inserted into said fixing wheel; the plurality of planetary rollers disposed between an inner circumferential surface of said fixing wheel and an outer circumferential surface of said sun shaft; and the carrier having pockets for rollably retaining said planetary rollers, each of the pockets having a first pocket surface being slidably contact with an outer circumferential surface of the planetary roller and a second pocket surface opposed to said first pocket surface in the circumferential direction wherein said carrier is provided with a friction force decreasing means for decreasing the friction force at at least one of the contacting area of the outer circumferential surface of the planetary rollers with the outer circumferential surface of the sun shaft and the contacting area of the outer circumferential surface of the planetary rollers with the first pocket surface of the carrier, wherein the carrier is formed separately from an output shaft, and is connected to the output shaft with a connection structure having a degree of freedom in the radial direction.

6. A planetary roller type power transmission device transmitting power between a sun shaft and a carrier via rotations of planetary rollers, comprising:

a fixing wheel;

the sun shaft being coaxially inserted into said fixing wheel; the plurality of planetary rollers disposed between an inner circumferential surface of said fixing wheel and an outer circumferential surface of said sun shaft; and the carrier having pockets for rollably retaining said planetary rollers, each of the pockets having a first pocket surface being slidably contact with an outer circumferential surface of the planetary roller and a second pocket surface opposed to said first pocket surface in the circumferential direction wherein said carrier is provided with a friction force decreasing means for decreasing the friction force at at least one of the contacting area of the outer circumferential surface of the planetary rollers with the outer circumferential surface of the sun shaft and the contacting area of the outer circumferential surface of the planetary rollers with the first pocket surface of the carrier, wherein a one-way clutch is disposed between a prime mover shaft and the sun shaft or between the carrier and an output shaft.

* * * * *